(12) United States Patent
Wang et al.

(10) Patent No.: US 6,492,062 B1
(45) Date of Patent: Dec. 10, 2002

(54) PRIMARY ALKALINE BATTERY INCLUDING NICKEL OXYHYDROXIDE

(75) Inventors: Francis Wang, Danbury, CT (US); Enoch Wang, Mansfield, MA (US); Philip Trainer, Sandy Hook, CT (US); Guang Wei, Southboro, MA (US)

(73) Assignee: The Gillette Company, Boston, MA (US)

( * ) Notice: Subject to any disclaimer, the term of this patent is extended or adjusted under 35 U.S.C. 154(b) by 117 days.

(21) Appl. No.: 09/633,067

(22) Filed: Aug. 4, 2000

(51) Int. Cl.[7] .............................. H01M 4/52; H01M 4/32
(52) U.S. Cl. ................ 429/223; 429/218.1; 429/231.3; 429/206; 429/229
(58) Field of Search .............................. 429/223, 218.1, 429/231.3, 206, 229

(56) References Cited

U.S. PATENT DOCUMENTS

| 3,899,350 A | 8/1975 | Jackovitz et al. ............. 136/29 |
| 3,911,094 A | 10/1975 | Megahed et al. ........... 423/592 |
| 4,074,030 A | 2/1978 | Ruben ......................... 429/223 |

(List continued on next page.)

FOREIGN PATENT DOCUMENTS

| EP | 0337029 A2 | * 10/1989 | ............ H01M/4/42 |
| EP | 0 337 029 A2 | 10/1989 | |
| EP | 0 800 222 A1 | 8/1997 | |
| GB | 1124299 | 8/1968 | |
| JP | 48-2384 | 1/1973 | ...................... 43/4 |
| JP | 56-145668 | 11/1981 | ...................... 4/24 |
| JP | 60143569 A | 6/1985 | ...................... 4/62 |
| JP | 61-158667 | 6/1986 | ...................... 4/62 |
| JP | 6318751 A | 8/1988 | ...................... 4/62 |
| JP | 01059766 A | 3/1989 | ...................... 4/32 |
| JP | 03055758 A | 3/1991 | ...................... 4/32 |
| JP | 04366553 A | 12/1992 | ...................... 4/52 |
| SU | 339995 | 6/1972 | ...................... 35/2 |
| WO | 00/21151 | 4/2000 | ...................... 4/48 |

OTHER PUBLICATIONS

M. Butel et al., Cobalt oxyhydroxides obtained by 'chimie douce' reactions: structure and electronic conductivity properties, 1999, Solid State Ionics, 122:271–284.*

"Sealed Nickel–Zinc Cells Using Stable Nicklec oxyhydroxide Depolarizer," S. A. Megahed et al., Proceedings of the Symposium on Battery Design and Optimization, *The Electrochemical Society, Inc.*, S. Gross, Ed., 79–1:259–282 (1979).

"Cobalt oxyhydroxides obtained by 'chimie douce' reactions: structure and electronic conductivity properties," M. Butel et al., *Solid State Ionics*, 122:271–284 (1999).

"Oxidation mechanism of cobalt hydroxide to cobalt oxyhydroxide," V. Pralong et al., *J. Mater. Chem.* 9:955–960 (1999).

*Primary Examiner*—Patrick Ryan
*Assistant Examiner*—Angela J. Martin
(74) *Attorney, Agent, or Firm*—Fish & Richardson P.C.

(57) ABSTRACT

An alkaline battery has a cathode including a nickel oxyhydroxide.

40 Claims, 2 Drawing Sheets

U.S. PATENT DOCUMENTS

| | | | |
|---|---|---|---|
| 4,224,392 A | 9/1980 | Oswin | 429/206 |
| 4,605,604 A | 8/1986 | Pollack et al. | 429/116 |
| 4,663,256 A | 5/1987 | Corrigan | 429/223 |
| 4,844,948 A | 7/1989 | Nakahori et al. | 49/126.3 |
| 5,336,276 A | 8/1994 | Pensabene et al. | 29/623 |
| 5,348,822 A | 9/1994 | Ovshinsky et al. | 429/223 |
| 5,453,336 A | 9/1995 | Adler et al. | 429/207 |
| 5,494,763 A | 2/1996 | Behl et al. | 429/206 |
| 5,508,121 A | 4/1996 | Sawa | 429/59 |
| 5,514,497 A | 5/1996 | Furukawa | 429/223 |
| 5,523,182 A * | 6/1996 | Ovshinsky et al. | 429/223 |
| 5,567,549 A | 10/1996 | Ovshinksy et al. | 429/223 |
| 5,569,562 A | 10/1996 | Glemser et al. | 429/223 |
| 5,620,813 A | 4/1997 | Lee et al. | 429/223 |
| 5,691,086 A | 11/1997 | Baba et al. | 429/218 |
| 5,744,259 A | 4/1998 | Ohta et al. | 429/59 |
| 5,744,266 A | 4/1998 | Junome et al. | 429/224 |
| 5,759,718 A | 6/1998 | Yao et al. | 429/223 |
| 5,928,714 A | 7/1999 | Nunome et al. | 427/126.3 |
| 5,958,621 A | 9/1999 | Kao | 429/217 |
| 6,007,946 A | 12/1999 | Yano et al. | 429/223 |
| 6,013,390 A | 1/2000 | Kimiya et al. | 429/206 |
| 6,020,088 A | 2/2000 | Singh | 429/223 |
| 6,083,642 A * | 7/2000 | Kato et al. | 429/218.1 |
| 6,114,063 A * | 9/2000 | Katsumoto et al. | 429/223 |
| 6,193,871 B1 * | 2/2001 | Coates et al. | 205/170 |
| 6,251,538 B1 * | 6/2001 | Seyama et al. | 429/223 |

* cited by examiner

PRIMARY ALKALINE BATTERY INCLUDING NICKEL OXYHYDROXIDE

TECHNICAL FIELD

This invention relates to batteries.

BACKGROUND

Batteries, such as primary alkaline batteries, are commonly used as energy sources. Generally, alkaline batteries include a cathode, an anode, a separator, and an electrolytic solution. The cathode can include an active material, such as manganese dioxide or nickel oxide, carbon particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

Desirable primary alkaline batteries have a high energy density and low capacity loss upon storage. Capacity retention upon storage can be important in primary battery systems where, unlike secondary battery systems, capacity cannot be recovered through recharging. Primary batteries having nickel oxide cathodes and amalgamated zinc anodes have high energy densities, but can lose significant amounts of capacity upon storage at 60° C. Self-discharge, either by hydrogen reduction or oxygen evolution from the nickel oxide cathode can result in loss of discharge capacity and formation of non-conductive regions.

SUMMARY

The invention features a primary alkaline battery including a nickel oxyhydroxide cathode. The battery preferably has a capacity loss after storage for 2 weeks at 60° C. of less than 40 percent. The cathode can include a cobalt oxyhydroxide-modified nickel oxyhydroxide or non-fractured nickel oxyhydroxide, which can improve the capacity loss proper ties of the battery.

Cobalt oxyhydroxide-modified nickel oxyhydroxide is a nickel oxyhydroxide having cobalt oxyhydroxide on a portion of the surface of the nickel oxyhydroxide. For example, the cobalt oxyhydroxide-modified nickel oxyhydroxide can be nickel oxyhydroxide having a coating of cobalt oxyhydroxide on a nickel oxyhydroxide. The coating can be substantially uniform, meaning that the coating covers at least 60% of the surface of the nickel material.

The nickel oxyhydroxide can be substantially non-fractured. Non-fractured nickel oxyhydroxide is nickel oxyhydroxide that is formed from nickel hydroxide by oxidation and inter-layer spacing contraction or no change in inter-layer spacing. For example, when α-Ni(OH)$_2$ is used as the precursor the degree of fracturing can be significantly reduced because α-Ni(OH)$_2$ has an inter-layer spacing of about 8 Å, which contracts upon formation of γ-NiOOH to about 7 Å. Alpha nickel hydroxide, α-Ni(OH)$_2$, is a class of nickel hydroxide materials that has the general formula:

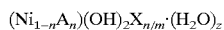

$$(Ni_{1-n}A_n)(OH)_2X_{n/m}\cdot(H_2O)_z$$

where A is Al, Co, Fe, Mn, or other trivalent metal ion, or a mixture thereof,

X is an anion having charge of -m, m being 1 or 2, n is between zero and 0.8, inclusive, and z is between 0 and 0.3, inclusive. X can be a halide, carbonate, carboxylate, sulfate, sulfite, phosphate, or phosphite. Preferably, A is Al, Co, Fe, or Mn, or a mixture thereof, X is $CO_3^{2-}$(m=2), $NO_3^-$(m=1), Cl$^-$(m=1), or $SO_4^{2-}$(m=2) and n is between zero and 0.3.

In one aspect, the invention features a primary alkaline battery including a cathode, an anode, a separator, and an alkaline electrolyte. The cathode can include a cobalt oxyhydroxide-modified nickel oxyhydroxide or a nickel oxyhydroxide derived from α-Ni(OH)$_2$. The nickel oxyhydroxide can be γ-NiOOH. The nickel oxyhydroxide can be substantially non-fractured.

In another aspect, the invention features a method of manufacturing an alkaline battery. The method includes assembling a cathode, an anode, a separator, and an alkaline electrolyte to form the alkaline battery. The method can include forming a cathode including the nickel oxyhydroxide. The method can also include forming a cobalt oxyhydroxide-modified nickel oxyhydroxide or non-fractured nickel oxyhydroxide. Forming the nickel oxyhydroxide can include converting α-Ni(OH)$_2$ to nickel oxyhydroxide, for example, by exposing nickel hydroxide to ozone.

In yet another aspect, the invention features a method of decreasing capacity loss in a nickel oxyhydroxide primary alkaline battery. The method includes forming a cathode including a nickel oxyhydroxide, and assembling the cathode, an anode, a separator, and an alkaline electrolyte to form the alkaline battery. The method can include converting α-Ni(OH)$_2$ to the nickel oxyhydroxide or converting cobalt hydroxide-coated α-Ni(OH)$_2$ to the nickel oxyhydroxide.

In another aspect, the invention features a cathode for a primary battery including non-fractured nickel oxyhydroxide or a cobalt oxyhydroxide-modified nickel oxyhydroxide.

The anode can include zinc.

In preferred embodiments, the cathode further includes an oxidizing additive. Reduction reactions at the surface or in the bulk of the nickel oxyhydroxide particles, which can lead to decreased storage capacities, can be partially eliminated or prevented by including oxidizing additives in the cathode. Electrochemically active additives are preferred to reduce oxygen evolution by raising the overpotential to avoid losses in capacity that can result from the use of electrochemically inactive additives.

Other features and advantages of the invention will be apparent from the description and drawings, and from the claims.

DETAILED DESCRIPTION

Figure 1:
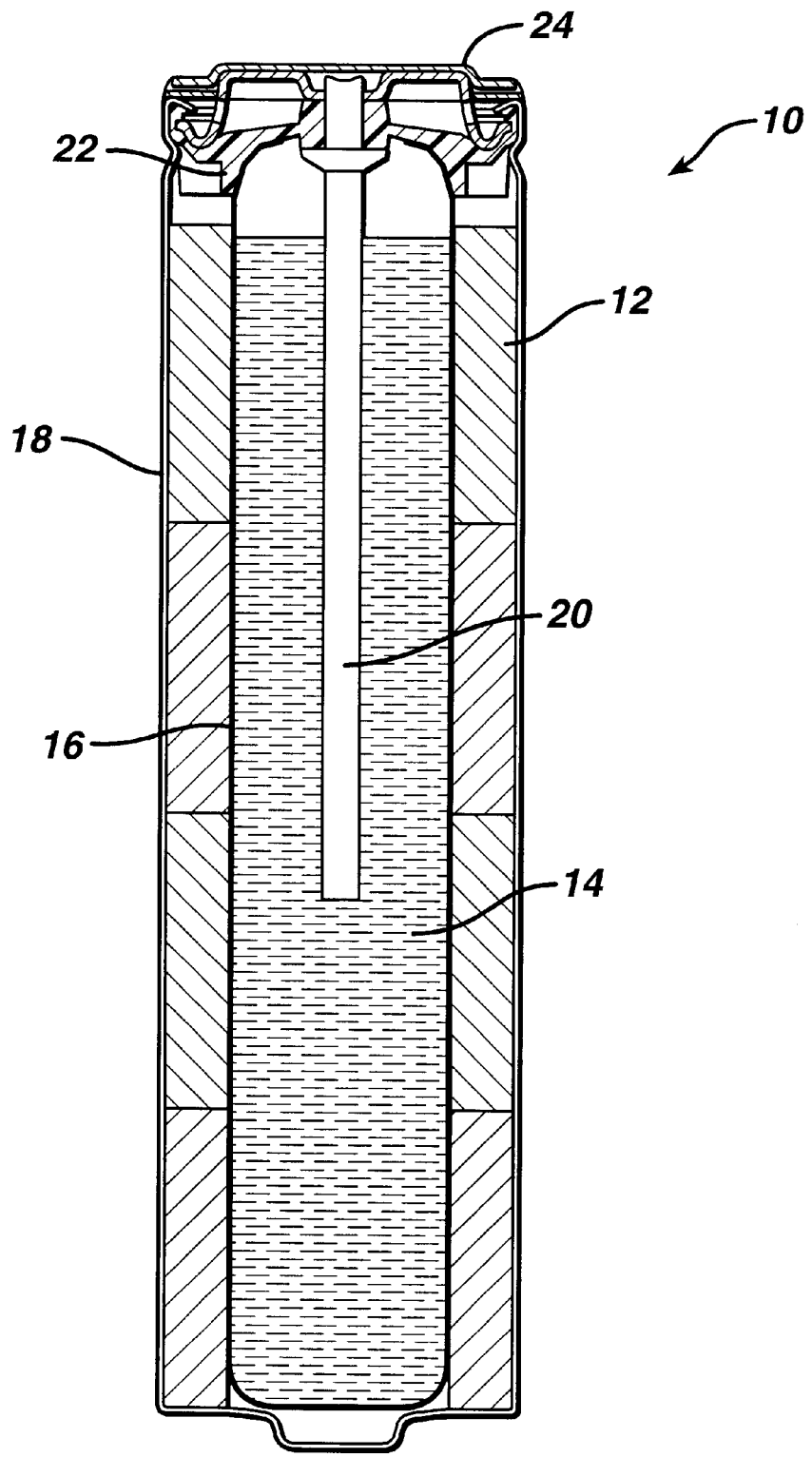
FIG. 1 is a cross-section view of a battery.

Referring to the FIG. 1, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Cathode 12 includes a cathode material, carbon particles, and a binder.

The cathode material can be nickel oxyhydroxide, silver oxide, or silver permanganate. The nickel oxyhydroxide can be γ-NiOOH, which has a high running voltage and high specific energy relative to manganese dioxide. The high valent γ form of NiOOH can be obtained by chemical oxidation, for example, by treating a nickel hydroxide with sodium hypochlorite or ozone. Alternatively, the high valent γ form of NiOOH can be prepared by electrochemical overcharging, for example, of β-NiOOH. Average nickel oxidation states as high as 3.67 can be obtained. The Ni(OH)$_2$ oxidation reaction with ozone is summarized in equation (1).

$$2Ni(OH)_2 + O_3 \rightarrow 2NiOOH + O_2 + H_2O \tag{1}$$

In particular, the cathode material can be a non-fractured nickel oxyhydroxide or a cobalt oxyhydroxide-modified nickel oxyhydroxide. The non-fractured nickel oxyhydroxide can be derived from α-Ni(OH)$_2$. Specifically, the α-Ni(OH)$_2$ can be oxidized by ozonation to form γ-NiOOH. The γ-NiOOH formed in this manner is non-fractured. When γ-NiOOH is formed from α-Ni(OH)$_2$, the inter-layer spacing expands from about 5 Å in β-Ni(OH)$_2$ to about 7 Å in γ-NiOOH. This relatively large crystallographic expansion results in macroscopic fragmentation of γ-NiOOH particles. The fragmentation can increase interfacial area between the NiOOH electrode and the electrolyte and result in significant capacity loss upon storage. When α-Ni(OH)$_2$ is used as the precursor, the degree of fracturing can be significantly reduced. The α-Ni(OH)$_2$ has an inter-layer spacing of about 8 Å, and after ozonation, the inter-layer spacing contracts to about 7 Å in γ-NiOOH. The relatively small change in inter-layer spacing, reduces the particle fragmentation. The non-fractured nickel oxyhydroxide formed from the α→γ an transformation maintains capacity upon storage significantly better than the fractured nickel oxyhydroxide formed from the β→γ transformation.

The cobalt oxyhydroxide-modified nickel oxyhydroxide can include a coating of a cobalt oxyhydroxide on a nickel oxyhydroxide. The cobalt oxyhydroxide can improve electrical contact between particles in the cathode and can protect the surface of the nickel oxyhydroxide from degradation. The coating covers at least 60% of the surface of the nickel oxyhydroxide. Preferably, the coating can cover at least 70%, preferably at least 80%, more preferably at least 90% of the surface. The cobalt oxyhydroxide-modified nickel oxyhydroxide can be derived from nickel hydroxide coated with between 2% and 15%, preferably between 3% and 10%, more preferably between 4% and 8%, and most preferably 5% cobalt hydroxide by weight.

The cobalt oxyhydroxide-modified nickel oxyhydroxide can be prepared by chemical or electrochemical oxidation of cobalt hydroxide and nickel hydroxide. The nickel hydroxide can be pre-treated with the cobalt hydroxide, for example, by exposing nickel hydroxide particles to a solution or suspension or cobalt hydroxide in water and drying the exposed nickel. A solid phase-gas phase technique can be used to produce t he cobalt oxyhydroxide-modified nickel oxyhydroxide. The CoOOH phase can be formed by reaction of Co(OH)$_2$ with ozone. The NiOOH is also formed by combining an alkali-metal hydroxide with Ni(OH)$_2$ and exposing the mixture to ozone as described, for example, in U.S. Pat. No. 3,911,094.

The solid-gas re action of Co(OH)$_2$ and oz one produces CoOOH and can be represented by equation (2).

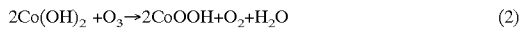
$$2Co(OH)_2 + O_3 \rightarrow 2CoOOH + O_2 + H_2O \tag{2}$$

The solid phase-gas phase reaction can produce CoOOH quantitatively. Ozonation can be carried out by exposing a powder of starting material to ozone and agitating the reaction mixture. The Co(OH)$_2$ changes color from light pink to dark brown as the CoOOH forms. The temperature of the starting material is maintained, for example, in a water bath. Moist ozone prepared from air is the preferred oxidizing agent. Periodically the reaction can be interrupted to grind the reactants to reduce agglomeration of particles and increase the amount of oxidation of Co(OH)$_2$ that occurs. Conductivity measurements for the CoOOH can be performed by measuring the resistivity of polycrystalline samples as a function of applied pressure. The conductivity of the CoOOH prepared by ozonation was calculated to be 0.12 S/cm$^2$ at a pressure of 2000 kg/cm$^2$.

The electronic conductivity of the CoOOH can be modified in a controlled manner by combining the Co(OH)$_2$ with various metal hydroxides prior to treatment with ozone. Suitable metal hydroxides include lithium hydroxide, sodium hydroxide, potassium hydroxide, rubidium hydroxide, cesium hydroxide, beryllium hydroxide, calcium hydroxide, magnesium hydroxide, or silver hydroxide. For example, when treated with sodium or potassium hydroxide, the cobalt oxyhydroxide can be a sodium- or potassium-modified cobalt oxyhydroxide. The cobalt hydroxide can be treated with a solid form of the metal hydroxide, such as a powder, or a solution of metal hydroxide, for example, in water. The cobalt hydroxide can be treated with up to 40% by weight, preferably 10% to 25% by weight, metal hydroxide, which after oxidation produces cobalt oxyhydroxide having favorable electronic conductivity and electrochemical performance. For example, CoOOH formed by ozonation after mixing 35 g of Co(OH)$_2$ with 6.3 g of solid KOH and 0.9 g of solid NaOH had a general formula: Co$_{0.69}$Na$_{0.06}$K$_{0.25}$OOH and a conductivity of 0.26S/cm$^2$ at a pressure of 2000 kg/cm$^2$.

Cobalt oxyhydroxide-coated nickel oxyhydroxide can be prepared by a clean single-step process. In this process, the electronic conductivity of the CoOOH can be effectively controlled by the addition of a metal hydroxide. Ni(OH)$_2$ coated with 5% by weight Co(OH)$_2$ can be treated with a mixture of sodium hydroxide and potassium hydroxide which is then treated with ozone to form conductive CoOOH coated NiOOH material.

The CoOOH coated NiOOH material produced by this method can be used as a cathode material in a primary alkaline Ni/Zn cell. Electrochemical characterization of alkaline Ni/Zn cells constructed with the CoOOH coated NiOOH shows good electrochemical performance and good storage characteristics. The coated cathode material can retain 87% of fresh capacity after 1 week of storage at 60° C. under low rate, constant current discharge conditions.

Figure 2A:
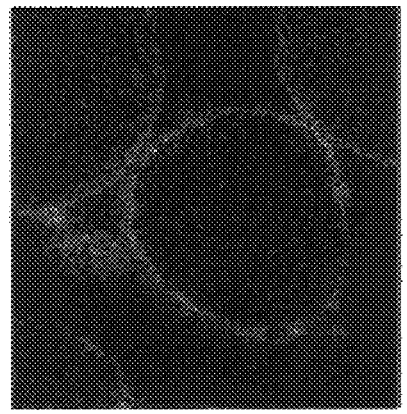
FIGS. 2a–c are electron micrographs of NiOOH particles.
Figure 2B:
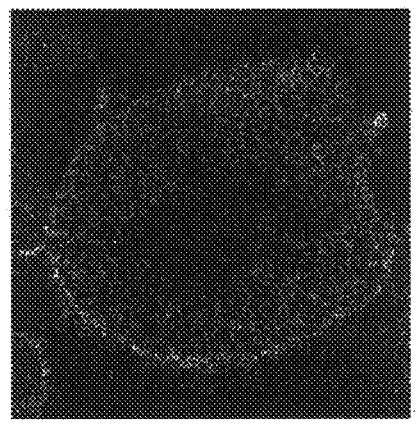
Figure 2C:
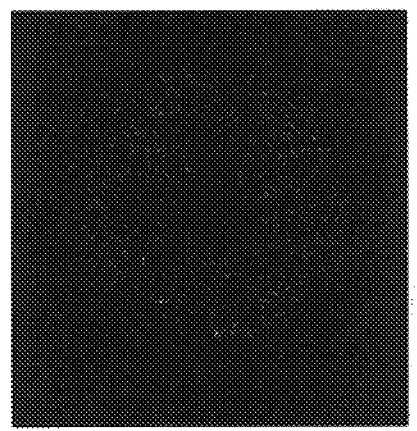

FIGS. 2a–c depict SEM electron micrographs showing elemental mapping of three cross-sectioned particles. High concentrations of cobalt are shown in the maps as bright spots. FIG. 2a is an elemental map of the starting material, Co(OH)$_2$-coated Ni(OH)$_2$. FIG. 2b is an elemental map of CoOOH-coated NiOOH. FIG. 2c is an elemental map of NiOOH prepared from a mixture of β-Ni(OH)$_2$ and Co(OH)$_2$ according to the method described in U.S. Pat. No. 3,911,094. The presence of cobalt in the CoOOH coated NiOOH, shown in FIG. 2b is diffuse, covering the surface of the particle, while the particle in FIG. 2c has a small amount of cobalt associated with the surface of the particle.

Distributors of starting materials for making the cathode material include HC Starck and JMC Tanaka Chemical Corp., Fukui, Japan (spherical nickel hydroxide Tanaka Type Z; cobalt hydroxide-coated spherical nickel hydroxide Tanaka Type CoZD). Generally the cathode may include, for example, between 80% and 90%, and preferably between 86% and 88%, of cathode material by weight.

The carbon particles can be graphite particles. The graphite can be synthetic or non-synthetic, or a blend of synthetic and non-synthetic. Suitable graphite particles can be obtained from, for example, Brazilian Nacional de Grafite (Itapecerica, MG Brazil (MP-0702X)) or Chuetsu Graphite Works, Ltd. (Chuetsu grades WH-20A and WH-20AF) of Japan. The cathode may include for example, between 3% and 7%, preferably between 4% and 6.5% carbon particles by weight.

Examples of binders include polyethylene powders, polyacrylamides, and fluorocarbon resins, such as PVDF and PTFE. An example of polyethylene binder is sold under the trade name Coathylene HA-1681 (available from Hoescht). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 weight percent $TiO_2$.

The cathode can also include an oxidizing additive. The cathode can include 1 to 10 weight percent oxidizing additive. The oxidizing additive can be physically mixed with the other cathode components, or one or more of the cathode components can be treated with a solution containing the oxidizing additive. Treatment with the solution can result in penetration of the additive into pores of the cathode component, which may result in longer, more sustained performance from the oxidizing additive.

The oxidizing additive is a material that is more readily reduced than the cathode material. For example, the oxidizing additive can be a material that is more oxidizing than nickel oxyhydroxide, such as NaOCl, $K_2S_2O_8$, $KMnO_4$, $H_2O_2$, $AgMnO_4$, or AgO. In particular, an alkaline cell using γ-NiOOH as the cathode material can be stabilized by the addition of small amounts (e.g., 1–10 wt %) of $K_2S_2O_8$ or KMnO4 into the cathode mixture by physically mixing the oxidizing additive with the γ-NiOOH and graphite.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Ser. No. 08/905,254, U.S. Ser. No. 09/115,867, and U.S. Ser. No. 09/156,915, which are assigned to the assignee in the present application and are hereby incorporated by reference. The anode may include, for example, between 67% and 71% of zinc particles by weight.

The electrolyte can be an aqueous solution of KOH or NaOH. The electrolyte can contain 20%–50% by weight alkali hydroxide dissolved in $H_2O$. The electrolyte can contain 0% to 4% by weight zinc oxide.

Examples of gelling agents include polyacrylic acids, grafted starch materials, salts of polyacrylic acids, polyacrylates, carboxymethylcellulose, sodium carboxymethylcellulose or combinations thereof. Examples of such polyacrylic acids are Carbopol 940 and 934 (available from B.F. Goodrich) and Polygel 4P (available from 3V), and an example of a grafted starch material is Waterlock A221 or A220 (available from Grain Processing Corporation, Muscatine, Iowa.). An example of a salt of a polyacrylic acid is Alcosorb G1 (available from Ciba Specialties). The anode may include, for example, from 0.1 percent to about 2 percent gelling agent by weight.

Gassing inhibitors can be inorganic materials, such as bismuth, tin, and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the trade name PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both. This conductive layer can be formed, for example, of a carbonaceous material. Such materials include LB1000 (Timcal), Eccocoat 257 (W.R. Grace & Co.), Electrodag 109 (Acheson Colloids Company), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

Button cells were prepared containing different nickel oxyhydroxide cathode materials. The capacity losses of the batteries were tested as described.

Reagent grade KOH (4.5 g) was dissolved in 100 mL of de-ionized water. Non-coated alpha nickel hydroxide (20 g) $(Ni_{0.62}Al_{0.18}Co_{0.031}(OH)_2(CO_3)_{0.13}(H_2O)_{0.17})$ (HC Starck)

was added to the KOH solution. The solution was heated on a hot-plate with stirring under a flow of argon to evaporate the water. The system was kept free of carbon dioxide to avoid carbonation of KOH. A paste was formed. The paste was dried in an oven at 80° C. under flowing argon to form a dry powder.

The KOH-coated α-Ni(OH)$_2$ (20 g) was placed in a modified Erlenmeyer flask that was modified to have internal flaps that help to disperse the powder. The flask was clamped to a holder which was attached to a motor. Ozone was generated by an ozone generator (Griffin Technics Inc., Model GTC-05). About 20 g/hr of ozone was produced with oxygen as the feed gas at a flow rate of 7 L/min at 12 psi and 120V. The ozone was passed over the Ni(OH)$_2$ powder inside the rotating flask inside a fume hood. The flask was rotated in a water-cooling bath at room temperature to maintain a constant temperature. Upon introduction of ozone, the green α-Ni(OH)$_2$ turned immediately to black and eventually to gray, signifying the end of the oxidation reaction and the formation of γ-NiOOH. The time for complete oxidation was about 45 hours. After ozonation, the powder was removed from the flask and stored in a Nalgene bottle.

The same process was used to prepare γ-NiOOH from β-Ni(OH)$_2$, CoOOH-coated γ-NiOOH from Co(OH)$_2$-coated α-Ni(OH)$_2$, and CoOOH-coated γ-NiOOH from Co(OH)$_2$-coated β-Ni(OH)$_2$.

Button cells were formed from four different cathode materials: (1) the γ-NiOOH produced from β-Ni(OH)$_2$ (control); (2) the γ-NiOOH produced from α-Ni(OH)$_2$; (3) the CoOOH-coated γ-NiOOH produced from Co(OH)$_2$-coated α-Ni(OH)$_2$; and (4) and the CoOOH-coated γ-NiOOH produced from Co(OH)$_2$-coated β-Ni(OH)$_2$. The cathode of each cell was prepared by combining 2.75 g of a γ-NiOOH active material, 1.75 g of graphite and 0.25 g of a 40 wt % KOH solution. These three components are then thoroughly mixed with a pestle and mortar. 0.5 g of the cathode mixture was pressed into a 635 button cell. The 635 button cells were then assembled by the addition of a porous polypropylene and 0.4 g of a Zn slurry containing 69 wt % Zn and 31 wt % aqueous KOH.

The batteries were then tested according to the following procedure. Cells were tested when freshly made or after storage at 60° C. for 1, 2, or 4 weeks. Materials were discharged at 3 ("low rate") and 43 mA ("high rate") in 635 button-cells. Specific capacity values were measured at a cut-off value of 0.8V for both fresh ("Initial Capacity") and stored ("Storage Capacity") discharges. Percent capacity loss was calculated for each test by the following equation: (1-(Storage Capacity)/(Initial Capacity))* 100.

Table 1 summarizes the storage properties of cells containing γ-NiOOH derived from β-Ni(OH)$_2$ (control) or α-Ni(OH)$_2$. The γ-NiOOH derived from α-Ni(OH)$_2$ has much less capacity loss than that of α-NiOOH derived from β-Ni(OH)$_2$. Table 2 summarizes the storage properties of cells containing CoOOH-coated γ-NiOOH derived from Co(OH)$_2$-coated β-Ni(OH)$_2$ (control) or Co(OH)$_2$-coated α-Ni(OH)$_2$. From Table 2, it is apparent that CoOOH-coated γ-NiOOH derived from β-Ni(OH)$_2$ has much less capacity loss than that of CoOOH-coated γ-NiOOH derived from α-Ni(OH)$_2$. A comparison of the results in Table 1 and Table 2 indicate that the cobalt-modified nickel oxyhydroxide had better storage characteristics than uncoated oxyhydroxide originating from the same nickel source. The batteries did not exhibit leakage attributable to gas evolution.

TABLE 1

| Cathode Material | % loss after 1 week at 60° C. | % loss after 2 weeks at 60° C. | % loss after 4 weeks at 60° C. |
| --- | --- | --- | --- |
| NiOOH from β-Ni(OH)$_2$ at a high rate | 90 | 90+ | 90+ |
| NiOOH from α-Ni(OH)$_2$ at a high rate | N/A | 24 | 33 |
| NiOOH from β-Ni(OH)$_2$ at a low rate | 70 | 70+ | 70+ |
| NiOOH from α-Ni(OH)$_2$ at a low rate | N/A | 30 | 39 |

TABLE 2

| Cathode Material | % loss after 1 week at 60° C. | % loss after 2 weeks at 60° C. | % loss after 4 weeks at 60° C. |
| --- | --- | --- | --- |
| CoOOH coated NiOOH from β-Ni(OH)$_2$ at a high rate | 20 | 29 | 38 |
| CoOOH coated NiOOH from β-Ni(OH)$_2$ at a high rate | 12 | 17 | 23 |
| CoOOH coated NiOOH from β-Ni(OH)$_2$ at a low rate | 23 | 27 | 44 |
| CoOOH coated NiOOH from α-Ni(OH)$_2$ at a low rate | 16 | 21 | 29 |

Button cells containing NiOOH prepared as described in U.S. Pat. No. 3,911,094 had a capacity loss upon storage at 60° C. for 1 week of 53%.

In another example, NiOOH was prepared by coating ground KOH pellets on alpha nickel hydroxide. The solid powders were mechanically ground to a fine homogeneous mixture before oxidation. Oxidation was carried out in ozone as described above. The resulting material had charge storage characteristics similar to the NiOOH prepared by exposure to a solution of KOH.

Another cell was prepared in which the cathode contained 5 wt % K$_2$S$_2$O$_8$. 5 g of a cathode mix was prepared by mixing together 2.75 g of γ-NiOOH active material derived from β-Ni(OH)$_2$, 0.25 g of K$_2$S$_2$O$_8$, 1.75 g of graphite and 0.25 g of 40% KOH solution. These four components were then thoroughly mixed with a pestle and mortar. 0.5 g of the 5% K$_2$S$_2$O$_8$/NiOOH mixture was pressed into a 635 button cell. The 635 button cells are then assembled by the addition of a porous separator and 0.4 g of a Zn slurry. The batteries were stored at 60° C. for 1, 2 and 4 weeks in 635 button-cells. The cells containing 5% K$_2$S$_2$O$_8$/NiOOH mixture, before and after storage, were discharged at 3 mA. The capacity loss after storage at 60° C. for 2 weeks was 32%.

Other embodiments are within the claims.

What is claimed is:

1. A primary alkaline battery comprising:
   a cathode comprising cobalt oxyhydroxide-modified nickel oxyhydroxide;
   an anode;
   a separator; and
   an alkaline electrolyte.

2. The battery of claim 1, wherein the cobalt oxyhydroxide-modified nickel oxyhydroxide has a coating of a cobalt oxyhydroxide on a nickel oxyhydroxide.

3. The battery of claim 1, wherein the coating is substantially uniform.

4. The battery of claim 1, wherein the nickel oxyhydroxide is γ-NiOOH.

5. The battery of claim 1, wherein the cobalt oxyhydroxide is a sodium or potassium modified cobalt oxyhydroxide.

6. The battery of claim 5, wherein the cobalt oxyhydroxide is a potassium modified cobalt oxyhydroxide.

7. The battery of claim 1, wherein the cobalt oxyhydroxide-modified nickel oxyhydroxide is derived from nickel hydroxide coated with between 2% and 15% cobalt hydroxide by weight.

8. The battery of claim 1, wherein the cobalt oxyhydroxide-modified nickel oxyhydroxide is derived from nickel hydroxide coated with between 3% and 10% cobalt hydroxide by weight.

9. The battery of claim 1, wherein the cobalt oxyhydroxide-modified nickel oxyhydroxide is derived from nickel hydroxide coated with between 4% and 8% cobalt hydroxide by weight.

10. The battery of claim 1, wherein the cobalt oxyhydroxide-modified nickel oxyhydroxide is derived from nickel hydroxide coated with 5% cobalt hydroxide by weight.

11. The battery of claim 1, wherein the cobalt oxyhydroxide-modified nickel oxyhydroxide is derived from α-Ni(OH)$_2$.

12. The battery of claim 1, wherein the anode comprises zinc.

13. The battery of claim 1, wherein the nickel oxyhydroxide is substantially non-fractured.

14. The battery of claim 1, wherein the cathode further includes an oxidizing additive.

15. The battery of claim 14, wherein the oxidizing additive includes $K_2S_2O_8$ or $KMnO_4$.

16. A primary alkaline battery comprising:
a cathode comprising a nickel oxyhydroxide derived from α-Ni(OH)$_2$;
an anode;
a separator; and
an alkaline electrolyte.

17. The battery of claim 16, wherein the nickel oxyhydroxide is a cobalt oxyhydroxide-modified nickel oxyhydroxide.

18. The battery of claim 16, wherein the cobalt oxyhydroxide-modified nickel oxyhydroxide has a coating of a cobalt oxyhydroxide on a nickel oxyhydroxide.

19. The battery of claim 18, wherein the coating is substantially uniform.

20. The battery of claim 18, wherein the cobalt oxyhydroxide is a sodium or potassium modified cobalt oxyhydroxide.

21. The battery of claim 18, wherein the cobalt oxyhydroxide is a potassium modified cobalt oxyhydroxide.

22. The battery of claim 17, wherein the cobalt oxyhydroxide-modified nickel oxyhydroxide is derived from nickel hydroxide coated with between 2% and 15% cobalt hydroxide by weight.

23. The battery of claim 16, wherein the anode comprises zinc.

24. The battery of claim 16, wherein the cathode further includes an oxidizing additive.

25. The battery of claim 24, wherein the oxidizing additive includes $K_2S_2O_8$ or KMnO4.

26. A cathode for a primary alkaline battery comprising non-fractured nickel oxyhydroxide.

27. The cathode of claim 26, wherein the non-fractured nickel oxyhydroixde is derived from α-Ni(OH)$_2$.

28. A cathode for a primary alkaline battery comprising a cobalt oxyhydroxide-modified nickel oxyhydroxide.

29. of claim 26, wherein the non-fractured nickel oxyhydroixde is derived from α-Ni(OH)$_2$.

30. A primary alkaline battery comprising:
a cathode comprising cobalt oxyhydroxide-modified nickel oxyhydroxide derived from α-Ni(OH)$_2$;
an anode comprising zinc;
a separator between the anode and the cathode; and
an alkaline electrolyte in contact with the anode and the cathode.

31. The battery of claim 30, wherein the cobalt oxyhydroxide-modified nickel oxyhydroxide has a coating of a cobalt oxyhydroxide on a nickel oxyhydroxide.

32. The battery of claim 30, wherein the nickel oxyhydroxide is substantially non-fractured.

33. The battery of claim 30, wherein the nickel oxyhydroxide is γ-NiOOH.

34. The battery of claim 30, wherein the cobalt oxyhydroxide is a sodium or potassium modified cobalt oxyhydroxide.

35. The battery of claim 34, wherein the cobalt oxyhydroxide is a potassium modified cobalt oxyhydroxide.

36. A primary alkaline battery comprising:
a cathode comprising a cobalt oxyhydroxide-modified-γ-nickel oxyhydroxide derived from α-Ni(OH)$_2$;
an anode;
a separator between the anode and the cathode; and
an alkaline electrolyte in contact with the anode and the cathode.

37. The battery of claim 36, wherein the cobalt oxyhydroxide-modified nickel oxyhydroxide has a coating of a cobalt oxyhydroxide on a nickel oxyhydroxide.

38. The battery of claim 37, wherein the coating is substantially uniform.

39. The battery of claim 36, wherein the cobalt oxyhydroxide is a sodium or potassium modified cobalt oxyhydroxide.

40. The battery of claim 36, wherein the cathode further includes an oxidizing additive.

* * * * *

UNITED STATES PATENT AND TRADEMARK OFFICE
CERTIFICATE OF CORRECTION

PATENT NO. : 6,492,062 B1
DATED : December 10, 2002
INVENTOR(S) : Francis Wang et al.

It is certified that error appears in the above-identified patent and that said Letters Patent is hereby corrected as shown below:

Title page,
Item [56], References Cited, U.S. PATENT DOCUMENTS, replace "Numone" with -- Junome --.
FOREIGN PATENT DOCUMENTS, replace "8/1997" with -- 10/1997 --.

Column 10,
Line 10, replace "KM$_n$O4" with -- KM$_n$O$_4$ --.
Line 14, replace "oxyhydroixde" with -- oxyhydroxide --.
Line 15, before "of" insert -- The battery --.
Lines 17-18, replace "oxyhydroixde" with -- oxyhydroxide --.

Signed and Sealed this

Twenty-ninth Day of June, 2004

JON W. DUDAS
*Acting Director of the United States Patent and Trademark Office*